May 6, 1947.  J. H. HAMMOND, JR  2,420,241
TORPEDO CONTROL VALVE
Filed Nov. 6, 1935  2 Sheets-Sheet 1

INVENTOR.
JOHN HAYS HAMMOND JR.
BY
Robert A. Lavender
ATTORNEY.

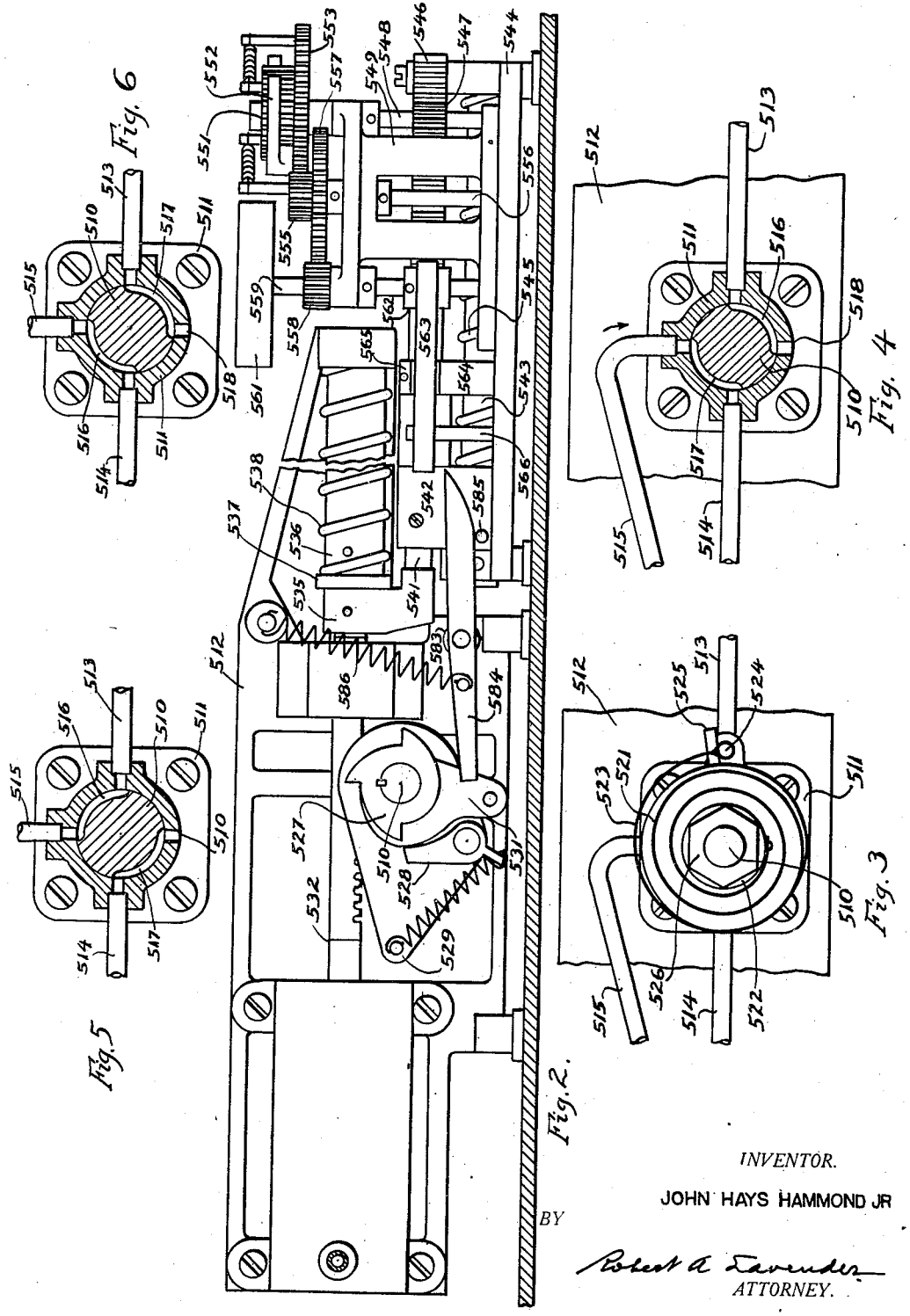

Patented May 6, 1947

2,420,241

UNITED STATES PATENT OFFICE 2,420,241

TORPEDO CONTROL VALVE

John Hays Hammond, Jr., Gloucester, Mass., assignor to the United States of America, as represented by the Secretary of the Navy Application November 6, 1935, Serial No. 48,584

6 Claims. (Cl. 137—144)

This invention relates to means for the admitting of fluid under pressure to either one of two pipes which in turn may be connected to any desired mechanism, such, for example, as the torpedo steering mechanism shown in Patent No. 1,659,653, dated February 21, 1928.

The invention provides for the action being delayed so that it is possible to select the desired position before the fluid is admitted to either pipe.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which:

Fig. 2 is a side elevation of same;

Fig. 3 is a rear elevation of part of the mechanism;

Fig. 4 is a sectional elevation taken on line 4—4 of Fig. 1;

Fig. 5 is the same as Fig. 4 with the parts in a different position; and

Fig. 6 is the same as Fig. 4 with the parts in a third position.

Like reference characters denote like parts in the several figures of the drawings.

Figure 1:
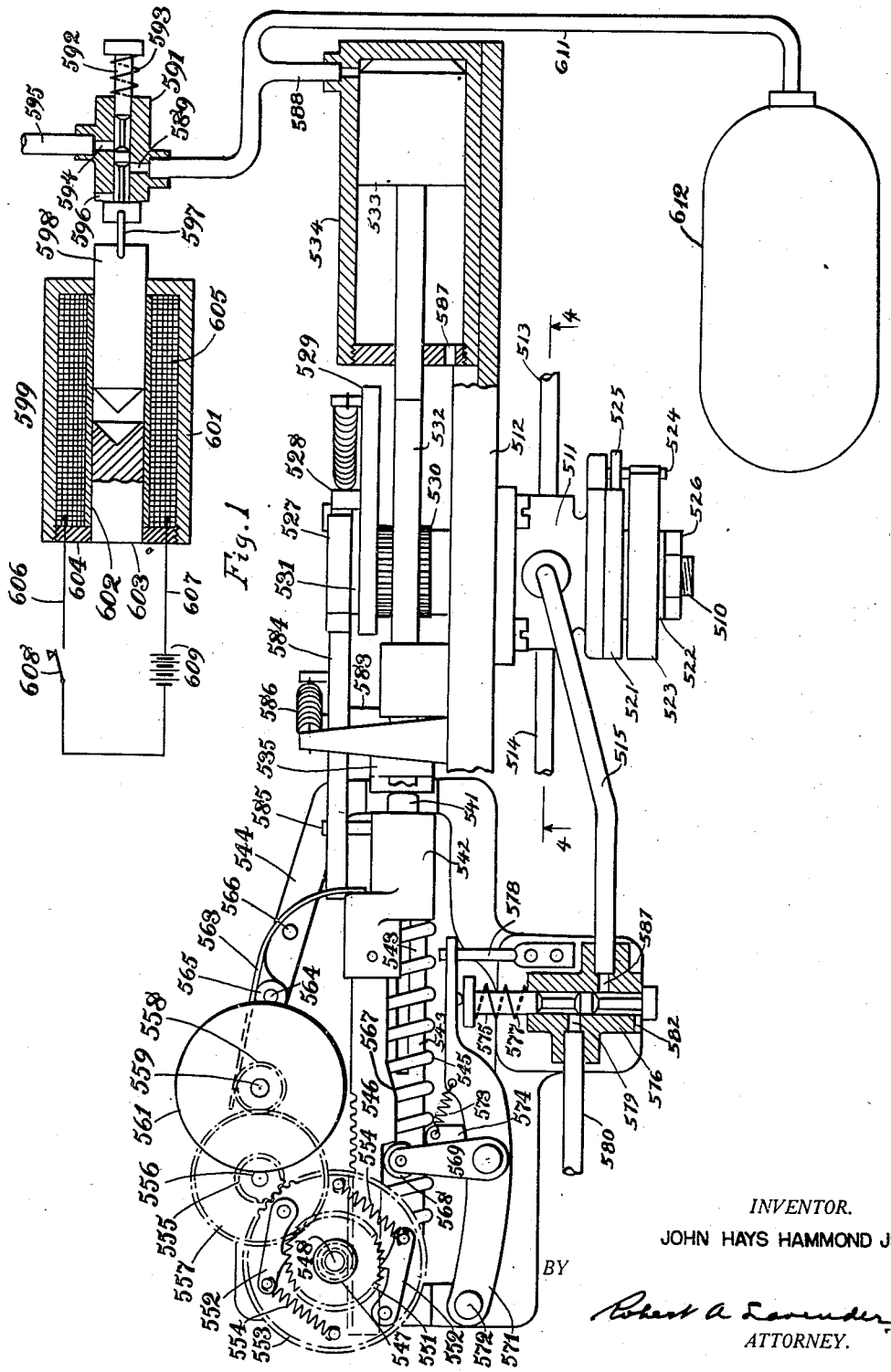
Fig. 1 is a diagrammatic view partly in section of a mechanism embodying the features of the present invention.

In the following description and in the claims, parts will be identified by specific names for convenience, but they are intended to be as generic in their application to similar parts as the art will permit.

Referring to the accompanying figures there is shown a valve 510, rotatably mounted in a casing 511, which is secured to a frame 512. Entering this casing are three pipes 513, 514, and 515. The pipes 513 and 514, if desired, may be connected to the pipes 90 and 91 shown in Figs. 3 and 10 of Patent No. 1,659,653. These pipes communicate with two grooves 516 and 517 in the valve 510. The valve casing 511 is provided with an exhaust port 518. Keyed to the shaft of the valve 510 is a member which consists of a flange 521 and a hub 522. Secured to this hub is one end of a coiled spring 523 the other end of which is attached to a pin 524 which is carried by the casing 511. A pin 525 secured to the flange 521 acts as a stop for the valve 510. A nut 526 holds the valve in position.

To the other end of the shaft of the valve 510 is keyed a ratchet 527 which cooperates with a spring pressed pawl 528 mounted on a plate 529 which is secured to a gear 530 loosely mounted on the shaft of the valve 510. Also, loosely mounted on this shaft between the ratchet 527 and the plate 529 is a cam plate 531 which is pinned to the frame 512 to prevent its rotation. The pawl 528 normally rests on the surface of this cam plate.

Meshing with the gear 530 is a rack 532 to one end of which is secured a piston 533 slidably mounted in a cylinder 534. To the other end of the rack 532 is pinned a dog 535 and a tube 536, and mounted therebetween is a collar 537. Loosely mounted on the tube 536 and between the collar 537 and the frame 512 is a coil spring 538.

Engaging the dog 535 is a plunger 541 slidably mounted in a member 542, which in turn is slidably mounted on a rod 543, secured to a frame 544. Loosely mounted on the rod 543 between the member 542 and the frame 544 is a coil spring 545. Mounted on the member 542 is a rack 546, which meshes with a pinion 547, secured to a shaft 548 which is rotatably mounted in a secondary frame 549. Pinned to the shaft 548 is a ratchet 551, which engages two pawls 552, pivotally mounted on a gear 553, which is loosely mounted on the shaft 548. Springs 554 tend to hold the pawls 552 in engagement with the ratchet 551. Meshing with the gear 553 is a pinion 555, secured to a shaft 556, which is rotatably mounted in the secondary frame 549. Secured to the shaft 556 is a gear 557, which meshes with a pinion 558, secured to a shaft 559 mounted for rotation in the secondary frame 549. Secured to the upper end of the shaft 559 is a fly wheel 561, and to the middle part of this shaft there is secured a collar 562. Engaging this collar is a brake arm 563 of spring brass or other spring material. This brake arm is pivotally mounted on a stud 564 carried by the frame 544. A collar 565 is pinned to the stud 564 to prevent the brake arm from coming off. The other end of the brake arm engages the member 542. A pin 566 limits the motion of the arm 563.

The rack 546 is provided with a cam surface 567, which is engaged by a roller 568 rotatably mounted in the end of an arm 569, which is pivotally mounted on a second arm 571, which is pivoted at 572 to the frame 544. A spring 573 tends to rotate the arm 569 in a clockwise direction. This motion is prevented, however, by a dog 574 integral with the arm 569 and abutting the underside of the arm 571. Engaging the end of the arm 571 is a valve stem 575, which is slidably mounted in a valve casing 576. A spring 577 holds the valve stem in the position shown, and a bracket 578, is mounted on the frame 544 and slides in a groove in the arm 571 so as to keep it in alignment with the valve stem 575. The valve casing 576 is provided with an inlet port 579 connected to a supply pipe 580, and an outlet port 587 connected to the pipe 515. An exhaust port 582 is provided at the end of the valve casing 576.

Pivotally mounted on a stud 583 which is secured to the frame 512 is an arm 584 one end of which at times engages the teeth of the ratchet 527. The other end of this arm is provided with a curved surface which in the normal position is engaged by a pin 585 mounted on the member 542. The arm 584 tends to be rotated in a clockwise direction under the action of a spring 586.

One end of the cylinder 534 is provided with a vent opening 587 and communicating with the other end is a pipe 588, which is connected to the outlet port 589 of a relay valve casing 591. Slidably mounted in this casing is a valve stem 592, which is held in the position shown in Fig. 1 by means of a spring 593. In the valve casing 591 is an inlet port 594 connected to a supply pipe 595. Exhaust port 596 is provided at one end of the valve casing 591. One end of the valve stem 592 is connected by a link 597 to a core 598 of a solenoid 599, the casing 601 of which is made of magnetic material such as soft iron. The core 598 slides in a tube 602 of a nonmagnetic material such as brass, in the other end of which is mounted a fixed core 603 of magnetic material. An annular piece 604 of magnetic material connects the casing 601 with the core 603. Wound on the tube 602 is a winding 605, the two ends of which are connected to conductors 606 and 607. The conductor 606 is connected through a key 608 to a battery 609 the other side of which is connected to the conductor 607. The pipe 588 is connected by a branch pipe 611 to an air chamber 612.

In the operation of the form of the invention shown in the accompanying figures the key 608 is depressed for a short interval of time by any desired means. By the action of the controlled current in electromagnet 605, core 598 moves to the left, which in turn moves the valve stem 592 to the left, allowing air to enter from the supply pipe 595 to the outlet pipe 588. This air then passes to the cylinder 534, causing the piston 533 to be actuated to the left. The rack 532 is thereby moved to the left thus rotating the gear 530 through half a revolution in a clockwise direction, as shown in Fig. 2. This effects a similar corresponding rotational movement of the plate 529 together with the pawl 528, which turns the ratchet 527 through a quarter revolution, thus rotating the rotary valve 510 into the position shown in Fig. 5. It will be noticed that the pawl 528 does not engage the first tooth of the ratchet 527 as it is prevented from doing so by the cam 531, but engages the second tooth. It is thus seen that although the plate 529 and the pawl 528 make a half revolution, the ratchet 527 together with the valve 510 only makes a quarter revolution.

At the same time, the dog 535 engages plunger 541 thereby causing a movement of the member 542 to the right against the action of the spring 545 (Fig. 2). This moves the pin 585 to the right which allows the arm 584 to be rotated in a clockwise direction by the spring 586, thus causing the left-hand end of the arc 584 to engage the third tooth of the ratchet 527. This motion is very rapid and as the ratchet 551 is turned in a clockwise direction (Fig. 1) the pawls 552 slip idly over the teeth of the ratchet. As the rack 546 moves to the left, the roller 568 rides over the cam surface 567, causing the arm 569 to be rotated about its pivot in a counterclockwise direction (Fig. 1) against the action of the spring 573. The spring 577 under these conditions is sufficiently strong to prevent any change in the position of the secondary arm 571. Upon the cessation of the electric impulse, the solenoid 599 is deenergized, thereby allowing the valve stem 598 to be restored to its normal position under the action of the spring 593. This cuts off the supply of air to the pipe 588, and connects it to the exhaust port 596, thus allowing air to be exhausted from the cylinder 534, and allowing the piston 533 to return to the right under the action of the spring 538. This restores the plate 529 and the pawl 528 to the position shown in Fig. 2, the pawl 528 riding up on the cam 531. At the same time, the dog 535 has moved to the right, thus allowing the member 542 under the action of the spring 545, to be moved to the right, drawing with it, the rack 546 which on this return motion rotates the pinion 547, the shaft 548, and the ratchet 551 in a counterclockwise direction (Fig. 1) thereby causing the pawls 552 to engage the teeth of the ratchet 551. This effects the rotation of the gear 553, which rotates the pinion 555 and the gear 557. This in turn rotates the pinion 558 and the fly wheel 561, thereby forming a damping arrangement, which causes the member 542 to proceed slowly to the right, the speed depending upon the gear ratios and the size of the fly wheel 561. As the rack 546 moves slowly to the right, the roller 568 rides upon the cam surface 567, but the arm 569 cannot rotate in a clockwise direction owing to the abutment of lug 574 against the under-side of the arm 571. The arm 569 moves downwardly, therefore, thereby causing the rotation of the secondary arm 571 about its pivot point 572. The motion of this arm is transmitted to the valve stem 575, which connects the supply pipe 580 to the outlet pipe 515, thus allowing air to enter this pipe and pass through the groove 516 to the pipe 513.

As the rack 546 continues to move to the right, the roller 568 is eventually dropped off the cam surface 567, and the arm 571 together with the valve stem 575 will be moved into their initial position under the action of the spring 577, thus shutting off the supply of air and connecting the pipe 513 to the exhaust 582 by way of the groove 516 and the pipe 515.

As the member 542 approaches its initial position, the pin 585 will slide along the curved surface of the arm 584 (Fig. 2) thereby rotating this arm in a counter-clockwise direction which disengages its left-hand end from the ratchet 527, thus allowing this ratchet, together with the valve 510 to be rotated in a counterclockwise direction by the coil spring 523. This rotation continues until the pin 525 engages the pin 524 thus stopping the valve 510 in its initial position as shown in Fig. 4. The air from the pipe 513 may then exhaust through groove 516 and exhaust port 518.

If it is desired to admit air to pipe 514, the key 608 is depressed for two short intervals instead of one. The first depression causes the solenoid 599 to be energized thereby admitting air to the cylinder 534, which as already described causes the valve 510 to be rotated through a quarter of a revolution to the position shown in Fig. 5. At the same time, the delay action mechanism is operated as already described. The second impulse, however, is made before the cam surface 567 reaches the roller 568, but after the piston 533 has been returned to its initial position. This second impulse causes the valve 510 to be rotated an additional quarter of a revolution into the position shown in Fig. 6. After the cessation of this impulse, the piston 533, rack 532, and plate 529 are returned to their initial position under the action of the spring 538. The member 542 then starts its move to the right (Fig. 1) under the action of the spring 545, this motion being retarded, as already described, by the action of the fly wheel 561. As this motion continues, the roller 568 will ride up on the cam surface 567, thereby moving the valve stem 575 downwardly and allowing air to pass from the pipe 580 to the pipe 515, thence through the groove 516 to the pipe 514. Further motion of the member 542 allows the roller 548 to drop off the cam surface 567, thereby allowing the valve stem 575 to be moved into its initial position under the action of the spring 577, thereby shutting off the supply of air to the pipe 515 and connecting it to the exhaust 582. As the member 542 reaches its initial position, the pin 585 engages the arm 584 thereby releasing the ratchet 527. This allows the valve 510 to be rotated to its initial position under the action of the coiled spring 523. In this position, the pipe 514 is still connected to the exhaust port 582 by way of the groove 517 and pipe 515.

The function of the air chamber 612 is to allow a certain interval of time to elapse between the opening of the solenoid valve 596 and the motion of the piston 533, as it is necessary to fill up this air chamber before the piston starts to move. In this way, any momentary operation of the solenoid valve 591 will not cause the rotary valve 510 to be operated.

The invention herein disclosed and described may be manufactured and used by or for the Government of the United States of America without the payment of any royalties thereon or therefor.

What is claimed is:

1. A device for supplying fluid under pressure to a selected pipe responsive to a single energizing impulse and for supplying fluid under pressure to a different pipe responsive to two relatively closely spaced energizing impulses comprising a normally closed two-way valve having an input port and two output ports, means for connecting said input port to one of said output ports when said valve is in a first operated position, means for connecting said input port to the other of said output ports when said valve is in a second operated position, a fluid supply pipe communicating with the input port of said valve, a normally closed valve in said supply pipe, means for moving said two-way valve to a first operated position responsive to a single said impulse and for moving said valve to a second operated position responsve to said two impulses and means operative to open said normally closed valve in the fluid supply pipe at a predetermined time after the actuation of said last mentioned means.

2. A device for supplying fluid under pressure to a selected pipe responsive to a single energizing impulse and for supplying fluid under pressure to a different pipe responsive to two relatively closely spaced energizing impulses comprising a normally closed two-way valve having an input port and two output ports, means for connecting said input port to one of said output ports when said valve is in a first operated position, means for connecting said input port to the other of said output ports when said valve is in a second operated position, a fluid supply pipe communicating with the input port of said valve, a normally closed valve in said supply pipe, means for moving said two-way valve to a first operated position responsive to a single said impulse and for moving said valve to a second operated position responsive to said two impulses, means operative to open said normally closed valve in the fluid supply pipe at a predetermined time after the actuation of said last mentioned means, and means for closing the valve in said fluid supply pipe and the two-way valve a predetermined time after the said valves open.

3. A device for remotely controlling the application of fluid under pressure to either one of two selected pipes for a predetermined time only comprising a normally closed one-way valve, a normally closed two-way valve, a source of fluid under pressure, means connecting said source to the input port of said one-way valve, means connecting the output port of said one-way valve to the input port of said two-way valve, means connecting the two said pipes to respective output ports of said two-way valve, a fluid operated means for actuating said two-way valve to connect the input port thereof to one of the two output ports responsive to the application of a single impulse of fluid to said fluid operating means, and for actuating said two-way valve to connect the input port thereof to the other of the output ports responsive to the application of two impulses of fluid to said fluid operating means and means for opening said one-way valve a predetermined time after the two-way valve has been set to a selected position.

4. A remote control selector system for applying fluid under pressure to a selected one of either of two pipes for a predetermined time only, comprising a normally closed two-way rotary valve having an input port communicating with a source of fluid under pressure and having output ports communicating with respective ones of said pipes, spring means for normally holding said two-way valve in closed position, a reciprocating rack member, means for normally holding said rack member in an inoperated position, a pinion engaging said rack, said pinion being ratchet connected to the two-way valve whereby the valve will be rotated one step each time said rack is moved to operated position, a ratchet member mounted on said valve, a pawl cooperating with said ratchet for holding said valve in a first or second operated position, a normally closed one-way valve interposed between said source of fluid under pressure, and means for opening said one-way valve for a predetermined time only responsive to the elapsing of a predetermined time after said rack is moved to operated position.

5. A system as set forth in claim 4 in which said last recited means comprises a second rack member having a portion thereof abutting said first rack member whereby said racks are movable together to operated position, spring means tending to move said second rack away from operated position, means for slowing down the return of said second rack member, a cam surface carried by said second rack member, said cam surface acting to open said one-way valve on the return movement of said second rack member during a predetermined portion only of said return movement.

6. Mechanism as described, comprising a fluid control valve having an inlet port, two outlet ports and an exhaust port and a member settable to connect either one of said outlet ports to said inlet port, means to actuate said settable member to connect one said outlet port to said inlet port by one impulse and to connect the other said outlet port to said inlet port by two impulses, means to apply said impulses to said actuating means, means to supply fluid to said valve, and means to delay automatically the supply of fluid to said valve for a predetermined time after the application of an impulse to said actuating means.

JOHN HAYS HAMMOND, JR.

REFERENCES CITED

The following references are of record in the file of this patent:

UNITED STATES PATENTS

| Number | Name | Date |
|---|---|---|
| 1,418,788 | Hammond | June 6, 1922 |
| 1,772,578 | Harford | Aug. 12, 1930 |
| 1,992,877 | Monthan | Feb. 26, 1935 |